(12) United States Patent
Desabhatla (10) Patent No.: US 11,056,989 B1
(45) Date of Patent: Jul. 6, 2021

(54) OPERATION OF POWER PLANT AT TRANSIENT LOADS DURING SWITCHING EVENT ON TRANSMISSION LINES

(71) Applicant: General Electric Company, Schenectady, NY (US)

(72) Inventor: Sreedhar Desabhatla, Munich (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/901,072

(22) Filed: Jun. 15, 2020

(51) Int. Cl.
H02P 9/10 (2006.01)
H02P 101/25 (2016.01)

(52) U.S. Cl.
CPC .............. *H02P 9/102* (2013.01); *H02P 9/105* (2013.01); *H02P 2101/25* (2015.01)

(58) Field of Classification Search
CPC ....... H02P 9/102; H02P 9/105; H02P 2101/25
USPC .......................................... 290/40 B; 322/19
See application file for complete search history.

(56) References Cited

U.S. PATENT DOCUMENTS

| | | | |
|---|---|---|---|
| 4,302,715 A | 11/1981 | Putman et al. | |
| 6,216,437 B1 | 4/2001 | Hepner et al. | |
| 7,642,664 B1 * | 1/2010 | Andrews | H02P 9/46 290/1 A |
| 8,946,916 B2 | 2/2015 | Tarnowski | |
| 9,590,550 B2 * | 3/2017 | Desabhatla | H02P 9/105 |
| 10,205,414 B2 | 2/2019 | Desabhatla et al. | |
| 2004/0008010 A1 | 1/2004 | Ebrahim et al. | |
| 2015/0200615 A1 * | 7/2015 | Desabhatla | H02J 3/24 322/19 |
| 2017/0346430 A1 * | 11/2017 | Desabhatla | H02J 3/24 |

* cited by examiner

*Primary Examiner* — Pedro J Cuevas
(74) *Attorney, Agent, or Firm* — Hoffman Warnick LLC (57) ABSTRACT

Embodiments of the disclosure provide a method for controlling a power plant. The method may include detecting a transient load on the power plant, and monitoring a system reactance during operation at the transient load. A system reactance of the grid is compared with a switching threshold indicative of a switching event on the set of transmission lines. If the switching threshold is exceeded, the gas turbine operates at the transient load using a first control setting with a transient fuel management profile, a transient split bias profile, and a dynamic intake parameter for the gas turbine. If the switching threshold is not exceeded but one of the electrical properties exceeds a stability threshold, the gas turbine operates at the transient load using a second control setting with the dynamic intake parameter for the gas turbine, and without the transient fuel management profile or the transient split bias profile.

20 Claims, 6 Drawing Sheets

OPERATION OF POWER PLANT AT TRANSIENT LOADS DURING SWITCHING EVENT ON TRANSMISSION LINES

BACKGROUND

The disclosure relates generally to the operation of power plants. More specifically, embodiments of the disclosure provide a methodology for operating a power plant at transient loads during a switching event on transmission lines.

Power plants typically include a variety of different turbomachines and/or systems that are used to generate a power output. Such power plants may include a prime mover (e.g., a rotatable shaft or similar element) for coupling a power source to an electric generator. For instance, a power plant may include a gas turbine assembly having a compressor coupled to a gas turbine. The gas turbine may be coupled to and drive a generator mounted on the same shaft. The generator produces a power output.

The generator may be electrically coupled to an electrical grid (i.e., electrical infrastructure for delivering power to customers) through various transmission lines. A technical challenge associated with operating a power plant is accommodating transient load demand, i.e., time periods where customer demand fluctuates significantly and requires the power plant to change from one level of output to a significantly higher or lower level of output. Conventional control systems for operating a power plant may distinguish between non-transient load and transient load settings by analyzing electrical properties of the grid by their effect on internal parameters of the power plant. Such approaches, however, are not sophisticated enough to distinguish between actual fluctuations in customer demand and variations that may arise from unforeseen circumstances (e.g., natural disasters, maintenance operations on the grid, etc.)

BRIEF DESCRIPTION

Aspects of the disclosure provide a method for controlling a power plant having a generator mechanically coupled to a gas turbine through a shaft, the generator electrically coupled to a grid through a set of transmission lines, the method including: detecting a transient load on the power plant, based on electrical properties of the grid and electrical properties of the power plant, wherein the electrical properties of the grid include a system reactance of the grid; monitoring the system reactance of the grid via the generator during operation of the power plant at the transient load; determining whether the system reactance of the grid exceeds a switching threshold, the switching threshold being indicative of a switching event on the set of transmission lines; in response to the system reactance exceeding the switching threshold: operating the gas turbine at the transient load using a first control setting, the first control setting including a transient fuel management profile, a transient split bias profile, and a dynamic intake parameter for the gas turbine; and in response to the system reactance not exceeding the switching threshold, and one of the electrical properties of the power plant exceeding a stability threshold: operating the gas turbine at the transient load using a second control setting, the second control setting including the dynamic intake parameter for the gas turbine, wherein the second control setting does not include the transient fuel management profile or the transient split bias profile.

Further aspects of the disclosure provide a program product stored on a computer readable storage medium for controlling a power plant having a generator mechanically coupled to a gas turbine through a shaft, and electrically coupled to a grid through a set of transmission lines, the computer readable storage medium including program code for causing a computer system to perform actions including: detecting a transient load on the power plant, based on electrical properties of the grid and electrical properties of the power plant, wherein the electrical properties of the grid include a system reactance of the grid; monitoring the system reactance of the grid via the generator during operation of the power plant at the transient load; determining whether the system reactance of the grid exceeds a switching threshold, the switching threshold being indicative of a switching event on the set of transmission lines; in response to the system reactance exceeding the switching threshold: operating the gas turbine at the transient load using a first control setting, the first control setting including a transient fuel management profile, a transient split bias profile, and a dynamic intake parameter for the gas turbine; and in response to the system reactance not exceeding the switching threshold, and one of the electrical properties of the power plant exceeding a stability threshold: operating the gas turbine at the transient load using a second control setting, the second control setting including the dynamic intake parameter for the gas turbine, wherein the second control setting does not include the transient fuel management profile or the transient split bias profile.

Additional aspects of the disclosure provide a system including: a power plant having a generator mechanically coupled to a gas turbine through a shaft, and electrically coupled to a grid through a set of transmission lines; and a system controller in communication with the gas turbine of the power plant, the system controller being operable to: detect a transient load on the power plant, based on electrical properties of the grid and electrical properties of the power plant, wherein the electrical properties of the grid include a system reactance of the grid; monitor the system reactance of the grid via the generator during operation of the power plant at the transient load; determine whether the system reactance of the grid exceeds a switching threshold, the switching threshold being indicative of a switching event on the set of transmission lines; in response to the system reactance exceeding the switching threshold: operate the gas turbine at the transient load using a first control setting, the first control setting including a transient fuel management profile, a transient split bias profile, and a dynamic intake parameter for the gas turbine; and in response to the system reactance not exceeding the switching threshold, and one of the electrical properties of the power plant exceeding a stability threshold: operate the gas turbine at the transient load using a second control setting, the second control setting including the dynamic intake parameter for the gas turbine, wherein the second control setting does not include the transient fuel management profile or the transient split bias profile.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology it will become necessary to select certain terminology when referring to and describing relevant machine components within the various systems, components, and other embodiments of the disclosure. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the present disclosure provide methods, program products, and systems for controlling a power plant. Such a power plant may include a generator mechanically coupled to, for example, a gas turbine through a shaft, and in which the generator is electrically coupled to a grid through a set of transmission lines. Methods of the disclosure are operable to detect whether a transient load on the power plant is caused by a fluctuation in demand by customers on the grid, or by a "switching event." As used herein, the term "switching event" refers to any event on an electrical grid which changes the number of available transmission lines that may be used to transfer power from the generator to the grid infrastructure. A switching event is thus one type of event which causes a power plant to operate at a transient load.

Methods according to the disclosure detect a transient load on the power plant, based on electrical properties of the grid and electrical properties of the power plant. Such properties, and related actions for detecting a transient load on the power plant via the generator, are discussed in further detail in U.S. Pat. No. 10,205,414 and incorporated by reference. Methods according to the disclosure may include monitoring a system reactance (i.e., electrical opposition to current flow stemming from inductive and/or capacitive components) during operation of the power plant at the transient load. Embodiments of the disclosure can compare the monitored reactance with one or more switching thresholds to evaluate whether a switching event has occurred. In the event that the calculated system reactance exceeds a switching threshold (i.e., it indicates a switching event), the disclosure may include operating the gas turbine via a first control setting with a transient fuel management profile, a transient split bias profile, and a dynamic intake parameter, to compensate for the switching event. The transient fuel management profile, transient split bias profile, and dynamic intake parameter of the first control setting may compensate for the sudden loss or restoration of transmission lines in the switching event. In the event that the calculated reactance does not exceed a switching threshold (i.e., a switching event has not occurred), but at least one monitored electrical property exceeds a stability threshold, the disclosure may include operating the gas turbine via a second control setting with only the dynamic intake parameter, and not the transient fuel management profile or transient split bias profile. The second control setting thus compensates for possible instability during the transient operation, without further compensating for changes in the transmission lines.

Figure 1:
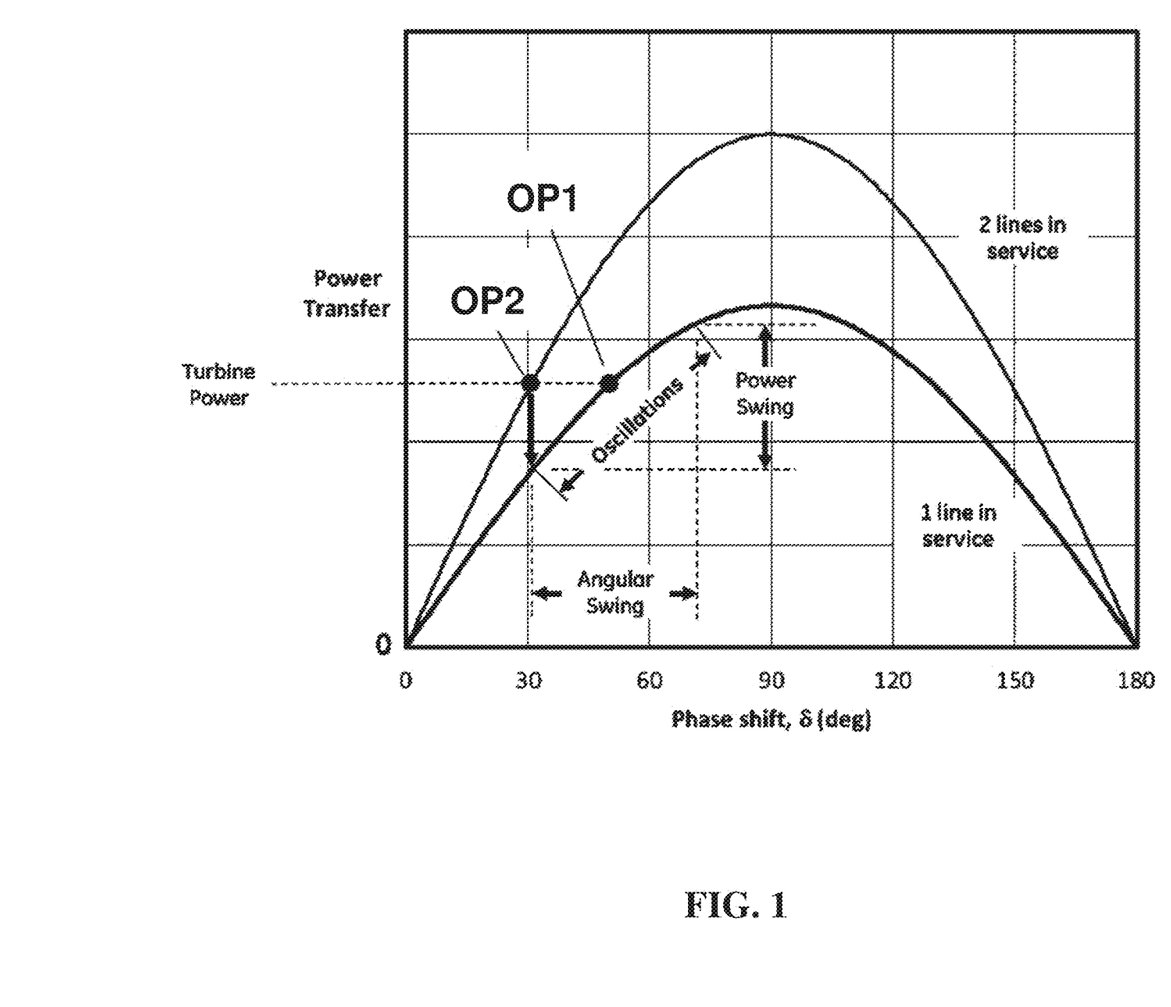
FIG. 1 is a comparative plot of power transfer in megawatts (MW) versus phase shift in degrees (deg), showing the effects of a switching event on a power plant while operating at a transient load.

Referring initially to FIG. 1, a plot of power transfer (i.e., the amount of power transferred from the generator to grid in Megawatts (MW)) for an alternating current (AC) generator for a grid, is illustrated. The plot depicts power transfer versus load angle/torque angle/power (e.g., the angle difference between generator and grid in degrees (deg or °) with two curves representing two states: operation with one transmission line in service, or operation with two transmission lines in service. In a simplified example, a switching event may include an operator of the grid simply using an electrical switch to allow or prohibit the passage of current through a selected transmission line. In further examples, a switching event may include the sudden and unexpected unavailability of one or more transmission lines as a result of, for example, a natural disaster, and the sudden restoration of one or more transmission lines when maintenance operations are conducted on the grid. Regardless of the underlying cause, switching events do not reflect a change in the actual demand for power on the grid but nonetheless may cause a significant temporary increase or decrease on the amount of power needed to maintain reliable power plant operation.

The plot in FIG. 1 depicts an example switching event, in which one of two transmission lines becomes unavailable for use. Initially, the generator may operate with a power output and phase shift indicated by point "OP2" on its power transfer profile. However, when a switching event occurs and causes one of the many transmission lines to become unavailable, the amount of power transferred to the grid is immediately reduced, e.g., proportionate to change in the reactance change from its initial value in the FIG. 1 example. If an operator of the power plant responds by increasing the power output from the generator, the loss of one transmission line will nonetheless affect the total phase shift between the generator and grid. This is depicted in the accompanying plot at point "OP1" on the power transfer profile for only one transmission line. Here, the power transfer may be equal to point "OP2" but may differ by a phase shift of approximately twenty degrees. Thus, the number of transmission lines available may significantly affect the electrical behavior of a power plant. Nonetheless, instructing a power plant to overcorrect for electrical changes from a switching operation may negatively affect the efficiency of fuel combustion and/or lifespan of power generation components within the power plant. Embodiments of the disclosure provide features for distinguishing between a switching operation and other transient events, to better manage the operation of a gas turbine during such events.

Figure 2:
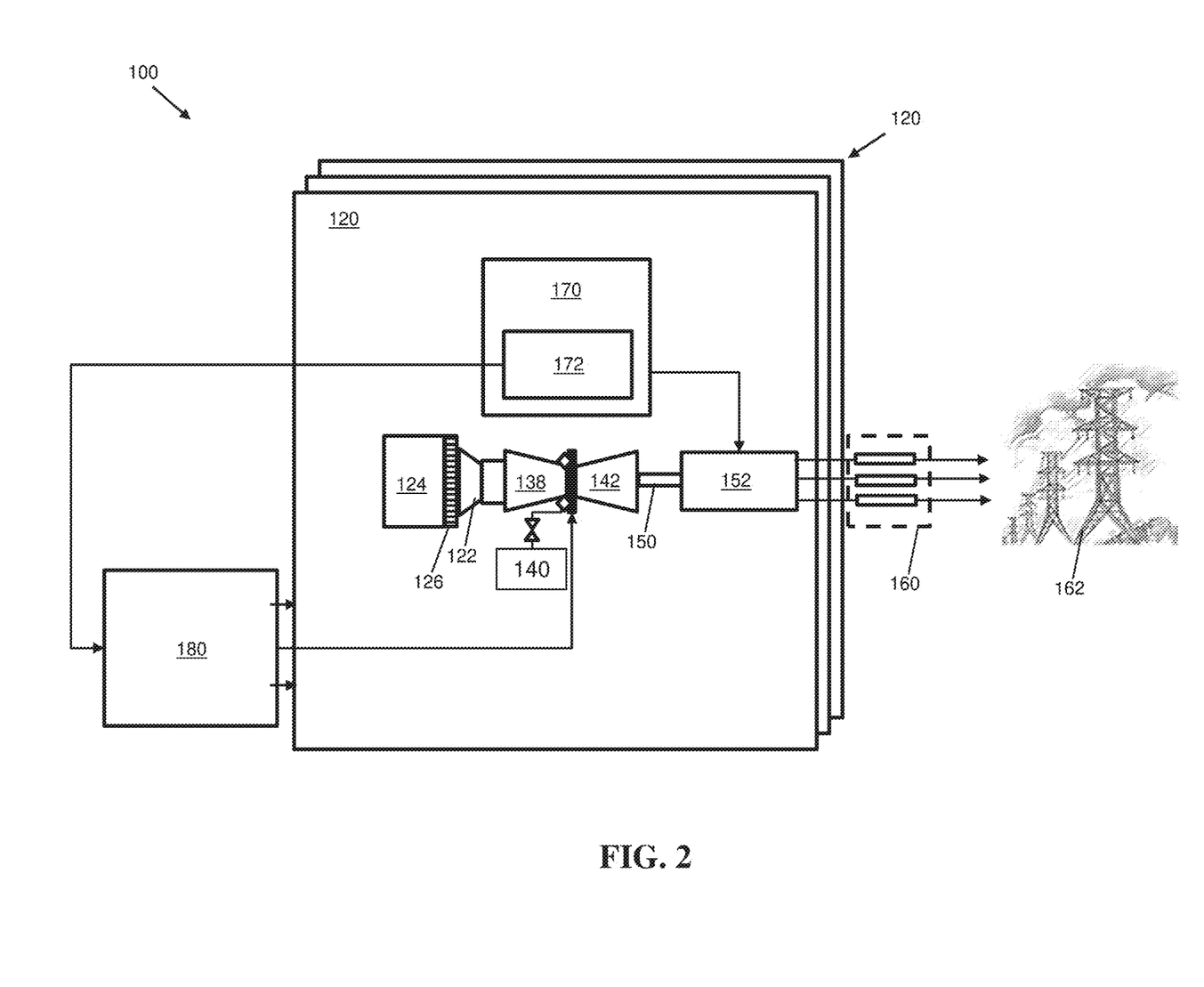
FIG. 2 is a schematic view of a power plant, grid, gas turbine control system, and excitation system, according to embodiments of the disclosure.

FIG. 2 shows a schematic depiction of a power plant 100 according to various embodiments of the disclosure. As shown, power plant 100 can take the form of a power plant with at least one turbomachine assembly (e.g., a gas turbine system, combined cycle power assembly, and/or other types of turbomachines) 120. Turbomachine assembly 120 is described by example herein as a gas turbine assembly, but other types of turbomachine assemblies may also be used in embodiments of the disclosure. Power plant 100 itself may include two, five, ten, one-hundred, or more turbomachine assemblies 120, and only one turbomachine assembly 120 is shown in detail in FIG. 2 solely for the sake of example. Other turbomachine assemblies 120 are represented schematically in FIG. 2 via accompanying boxes. turbomachine assembly 120 may include a compressor 122. Compressor 122 compresses an incoming flow of fluid (e.g., air) from an inlet 124 as it flows through compressor 122. Compressor 122 may include a plurality of stages of stator vanes (not shown) and rotating blades (not shown) positioned within compressor 122. The stator vanes and rotating blades positioned within compressor 122 may be configured to aid in moving and/or passing fluid through compressor 122. Compressor 122 may include a set of inlet guide vanes (IGVs) 126. IGVs 126 are a type of adjustable compressor inlet vanes that is structured specifically to direct the incoming flow of operating fluid onto the rotating blades of compressor 122. IGVs 126 may be adjustable between several positions to affect the flow rate, incident angle, and/or other properties of fluid entering compressor 122. IGVs 126 thus may be capable of affecting the temperature of compressor 122, the power output from turbomachine assembly 120, and/or other properties.

Compressor 122 delivers a flow of compressed fluid (e.g., compressed air) to a combustor 138. Combustor 138 mixes the flow of compressed fluid with a pressurized flow of fuel provided by a fuel supply 140 and ignites the mixture to create a flow of combustion gas. The flow of combustion gas is in turn delivered to a turbine component 142, which typically includes a plurality of stages of stator vanes (not shown) and turbine blades (not shown), similar to compressor 122. The flow of combustion gas drives turbine component 142 to produce mechanical work. The mechanical work produced in turbine component 142 drives compressor 122 via a shaft 150, and may be used to drive a generator 152 (e.g., an external component) configured to generate power. A set (i.e., any desired number) of transmission lines 160 electrically couple generator 152 to a grid 162. Transmission lines 160 each may be coupled to one or more of the various turbomachine assemblies 120 within power plant 100. Grid 162 is indicative of any electrical infrastructure for carrying energy from power plant 100 to its customers, e.g., electrical substations, distribution lines, etc.

As shown in FIG. 2, power plant 100 may include an excitation system (simply "exciter" hereafter) 170 for providing a direct current (DC) voltage and current to field windings (not shown) of shaft 150 within generator 152. Exciter 170 produces a magnetic field of sufficient magnitude for shaft 150 in the form of a generator rotor to generate its rated generator terminal voltage. Thus, exciter 170 initiates the conversion of mechanical power to electrical power, which is delivered to grid 162 through transmission lines 160. Exciter 170 may control the amplitude and phase properties of the voltage output by generator 152. As such, exciter 170 may synchronize the voltage output by generator 152 with the voltage of electrical grid 162 after shaft 150 begins to rotate at its targeted speed.

An exciter controller 172 may be included within, or otherwise may be in electrical communication with, exciter 170 to control various electrical properties of exciter 170 during operation. Such properties may include the target amplitude, and/or phase properties of AC currents produced by generator 152. Exciter controller 172 may control the time and magnitude of voltages applied by exciter 170, thereby influencing the electrical operation of turbomachine assembly 120 120. System 100 similarly may include a gas turbine ("GT") controller 180 configured to directly control the operation of turbomachine assembly 120. GT controller 180 thus may be structurally integrated into turbomachine assembly 120, or may be embodied as a separate controller that is in communication with turbomachine assembly 120. One or both of exciter controller 172 and GT controller 180 may be in operational communication with turbomachine assembly 120 via any suitable electronic and/or mechanical communication component or technique. Controller(s) 172, 180 and their various components discussed herein each may be a single stand-alone system that functions as part of, or separately from, another power plant control system (e.g., computing device) (not shown) that may control and/or adjust operations and/or functions of power plant 100.

Methods according to the disclosure may be implemented, e.g., by monitoring the electrical properties of grid 162 and exciter 170 and controlling the operation of turbomachine assembly 120 based on the monitoring electrical properties. Exciter controller 172 may include and/or may be in electrical and/or mechanical communication with GT controller 180, which in turn may be connected to turbomachine assembly 120 by way of various sensors, valves, solenoids, actuators, converters, etc. (not shown) positioned throughout power plant 100. Thus, exciter controller 172 may directly measure one or more electrical properties of turbomachine assembly 120 to monitor corresponding properties of grid 162. According to an example, exciter controller 172 may include one or more voltmeters, ammeters, or other electronic testing equipment for monitoring the amplitude, frequency, phase, and/or other electrical properties of generator 152 as it operates. Exciter controller 172 may additionally or alternatively include positional sensors, rotational sensors, etc., for deriving electrical properties from the rotation of shaft 150 and/or other related mechanical quantities. Exciter controller 172 may apply algorithms, formulae, etc., to derive electrical properties of grid 162 (e.g., power transfer, impedance, reactance, etc.) from the operation of generator 152 and/or other components of turbomachine assembly 120.

Figure 3:
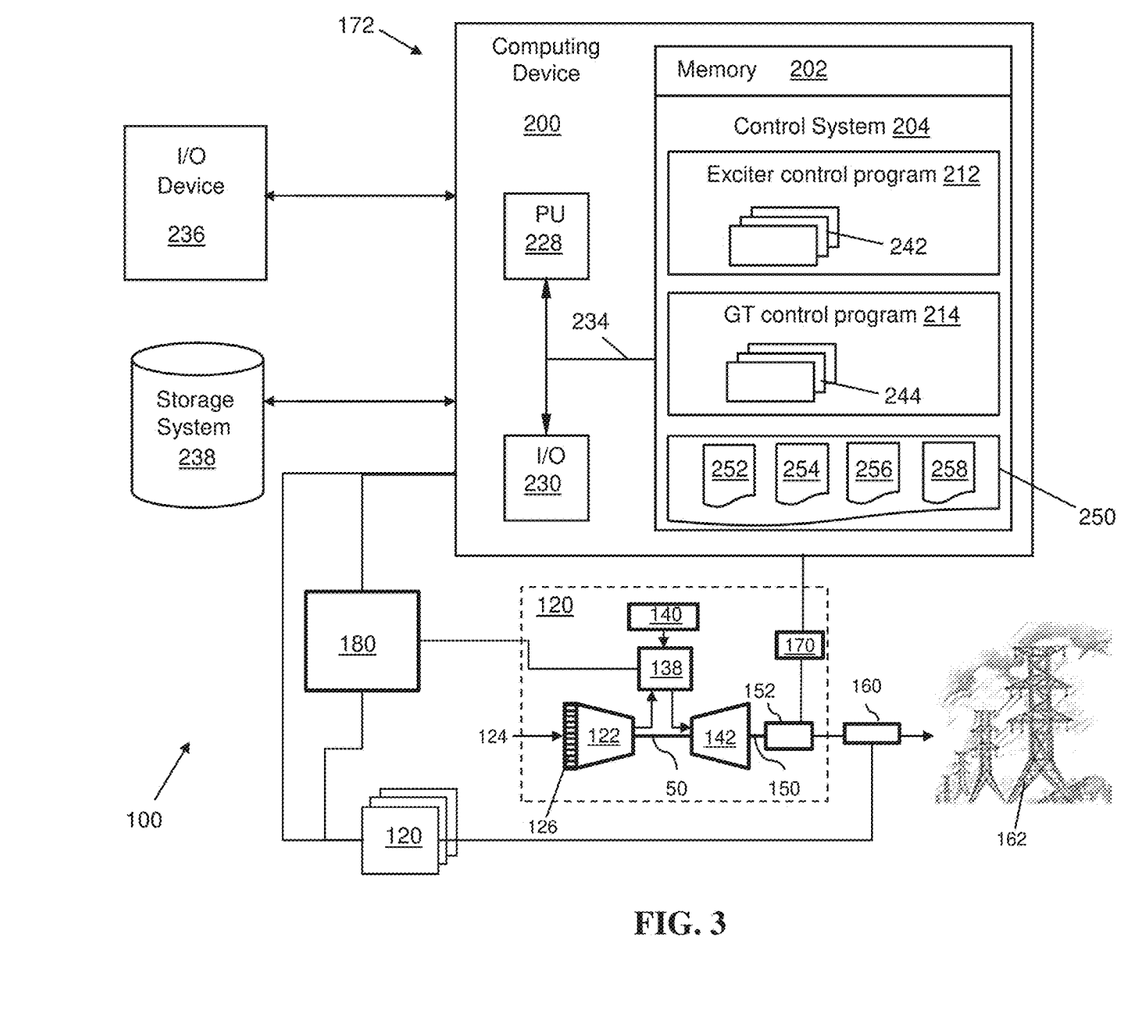
FIG. 3 shows a schematic view of an exciter controller, power plant, grid, and various subcomponents, according to embodiments of the present disclosure.

Referring to FIGS. 2 and 3 together, a schematic depiction of exciter controller 172 and subcomponents thereof is illustrated as part of power plant 100. In the FIG. 3 illustration, only one turbomachine assembly 120 is shown in detail, while other turbomachine assemblies 120 are represented in a simplified form for clarity of illustration. As shown, exciter controller 172 may include a computing device 200, which may include a memory 202 with a control system 204 operating thereon. Control system 204 may be a software system integrated with portions of exciter 170, or otherwise in operative communication therewith. Control system 204 may be implemented by way of two subprograms, e.g., an exciter control program 212 and a GT control program 214. Exciter control program 212 may monitor and/or control various operations of exciter 170, while GT control program 214 may be in communication with GT controller 180 to provide instructions thereto, and/or to modify the actions of another control program of GT controller 180. Although exciter controller 172 and GT controller 180 may be operationally independent of each other and/or implemented using different computing devices 200, it is understood that exciter controller 172 and GT controller 180 alternatively may be implemented using a single device and/or hardware component. Exciter controller 172 as shown in FIG. 3 represents one type of configuration for interacting with and/or controlling power plant 100. As discussed herein, exciter controller 172 may control the magnitude, time span, and/or other properties of voltages that exciter 170 applies to generator 152. Within exciter controller 172, exciter control program 212 may monitor and/or interact with exciter 170, while GT control program 214 may interact with, and in some cases override, operations that GT controller 180 undertakes to control turbomachine assembly 120 during operation.

According to an example, exciter controller 172 may monitor electrical properties of generator 152, grid 162, and/or exciter 170 to detect a transient load on turbomachine assembly 120, and evaluate whether a switching event has occurred within transmission line(s) 160. GT control program 214 may interact with exciter control program 212 by causing GT controller 180 to operate turbomachine assembly 120 with a first control setting or second control setting, based on whether a switching event is detected. Embodiments of the present disclosure may be configured or operated in part by a technician, computing device 200, and/or a combination of a technician and computing device 200. It is understood that some of the various components shown in FIG. 3 can be implemented independently, combined, and/or stored in memory for one or more separate computing devices that are included in computing device 200. Further, it is understood that some of the components and/or functionality may not be implemented, or additional schemas and/or functionality may be included as part of control system 204.

Computing device 200 can include a processor unit (PU) 228, an input/output (I/O) interface 230, memory 202, and a bus 234. Further, computing device 200 is shown in communication with an external I/O device 236 and a storage system 238. Control system 204 may provide exciter control program 212, which in turn can operate using various modules 242 (e.g., a calculator, a determinator, a comparator, etc.) for implementing various functions and/or logical steps. Control system 204 additionally may provide GT control program 214 with its own set of modules 244 (e.g., a calculator, determinator, comparator, etc.) for implementing respective functions and/or steps of GT control program 214. The various modules 242, 244 can use algorithm-based calculations, look up tables, and similar tools stored in memory 202 for processing, analyzing, and operating on data to perform their respective functions. In general, PU 228 can execute computer program code to run software, such as control system 204, which can be stored in memory 202 and/or storage system 238. While executing computer program code, PU 228 can read and/or write data to or from memory 202, storage system 238, and/or I/O interface 236. Bus 234 can provide a communications link between each of the components in computing device 200. I/O device 230 can comprise any device that enables a user to interact with computing device 200 or any device that enables computing device 200 to communicate with the equipment described herein and/or other computing devices. I/O device 230 (including but not limited to keyboards, displays, pointing devices, etc.) can be coupled to exciter controller 172 either directly or through intervening I/O controllers (not shown).

Memory 202 can also include various forms of data 250 pertaining to various components of power plant 100, e.g., turbomachine assembly 120 and/or one or more of its subcomponents, transmission lines 160, grid 162, etc. Control system 204 and one or more of its component programs (e.g., exciter control program 212 and/or GT control program 214) can store and interact with data 250 subdivided into various fields. For example, generator data field 252 can store data pertaining to electrical properties of generator 152 (e.g., voltage amplitudes, generation frequencies, phase shifts, internal reactance, etc.). Data 250 can also include a grid data field 254 for cataloguing data for monitored electrical properties of grid 162 (e.g., voltage amplitudes, load frequencies, load phase shifts, external or measured reactances, etc.). One or more switching threshold values for the system reactance (i.e., the internal opposition to electrical current caused by inductive and/or capacitive couplings) of generator 152 can be stored in a threshold field 256. Such switching thresholds may specify a reactance indicative of a switching event (e.g., a monitored reactance of approximately two-thousand Megaohms (MΩ)). Threshold field 256 may include multiple switching threshold reactances for comparison in processing, e.g., to distinguish between various types of switching events and other types of transient loads on turbomachine assembly 120. Data 250 may also include, e.g., a control setting field 258, for recording different operational parameters for power plant 100 operation at non-transient loads, transient loads caused by a switching event, and/or transient loads not caused by a switching event. Control setting field 258 may be separated into distinct control settings (e.g., first control setting, second control setting, non-transient control setting, etc.), each of which may correspond to operation of turbomachine assembly 120 under particular circumstances. Each control setting within control setting field 258 may include one or more of a fuel management profile (e.g., to control the combustion rate, combustion temperature, fuel injection rate, etc., of turbomachine assembly 120), a split bias profile (e.g., to control the ratio between air and fuel provided to combustor 138 of turbomachine assembly 120 in power plant 100), an intake parameter (e.g., to control the amount of air transmitted through inlet 124, IGV position 126, etc.), and/or other parameters. The various parameters included within control settings of control setting field 258 may be adjusted using GT controller 180, and/or other portions of turbomachine assembly 120.

Computing device 200 can comprise any general purpose computing article of manufacture for executing computer program code installed by a user (e.g., a personal computer, server, handheld device, etc.). However, it is understood that computing device 200 is only representative of various possible equivalent computing devices and/or technicians that may perform the various process steps of the disclosure. In addition, computing device 200 can be part of a larger system architecture operable to model and/or control various aspects and elements of exciter 170, GT controller 180, and/or other components of turbomachine assembly 120 or power plant 100.

To this extent, in other embodiments, computing device 200 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 200 may include a program product stored on a computer readable storage device, which can be operative to automatically control other elements of power plant 100 when executed. Computing device 200 may also take the form of, e.g., a remote monitoring system that is part of a central monitoring system, which in turn is responsible for monitoring several power plants, turbomachine assemblies 120, grids 162, etc. In this case, computing device 200 may represent a portion or subcomponent of a central monitoring system.

Figure 4:
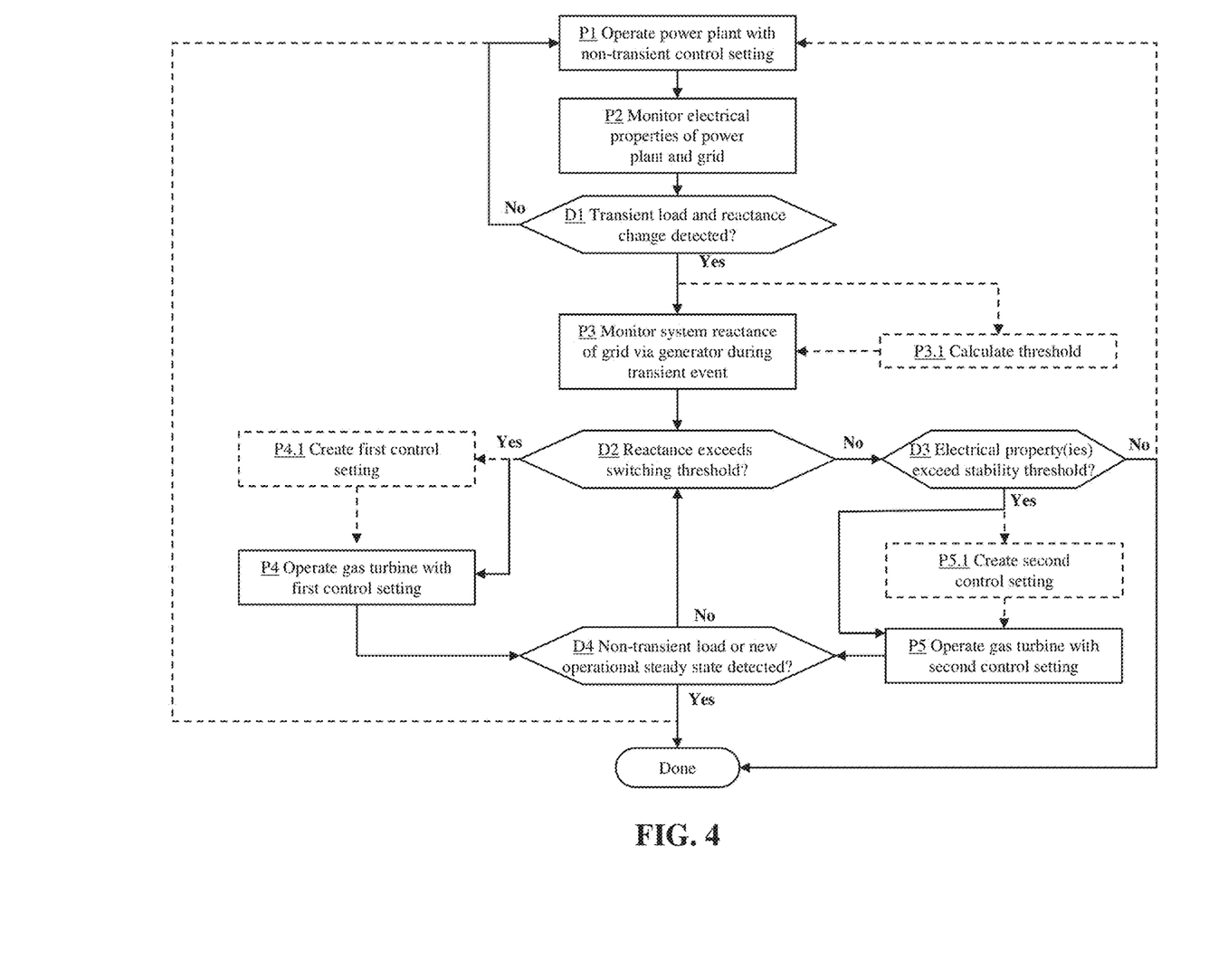
FIG. 4 provides an illustrative flow diagram of a method for operating a power plant at transient loads during a switching event on transmission lines, according to embodiments of the present disclosure.

Referring to FIGS. 3 and 4, embodiments of the disclosure provide a method to control a power plant such as power plant 100 including one or more turbomachine assemblies 120. Power plant 100 may include GT system(s) 120 that deliver power to grid 162 through transmission lines 160, as discussed herein. According to a specific example, FIG. 4 provides a flow diagram for controlling the operation of power plant 100 in the example configuration shown, though control of power plant 100 in other configurations is also possible using embodiments of the example process flow shown in FIG. 4. Embodiments of the methodologies described herein may be implemented, e.g., using exciter controller 172, and/or various modules and/or subcomponents of computing device 200. Methods according to the disclosure may also rely on other components such as GT controller 180 communicatively coupled to computing device 200 to operate turbomachine assembly 120 using various control settings as discussed herein. Power plant 100 may be operable to distinguish between multiple types of transient loads on GT system(s) 120, and in particular may determine whether transient loads are caused by a switching event within one of transmission lines 160. The illustrative flow diagram in FIG. 4 is shown with several processes organized in an example flow, but it is understood that one or more processes may be implemented simultaneously and/or sequentially, and/or executed in any alternative order while maintaining the various technical features described by example herein.

An example implementation of the disclosure may occur while power plant 100 is generating power to meet a non-transient load on grid 162, process P1. In this case, the method may initially include operating power plant 100 to generate a non-transient load (e.g., a base load, a minimum load, a maximum load, and/or any other power output that does not vary significantly over time). In this case, exciter controller 172 and/or GT controller 180 may use a non-transient control setting such that turbomachine assembly 120 will generate power at a substantially fixed magnitude, and at a frequency and phase shift that are selected to match the operating characteristics of grid 162. In further examples, the non-transient control settings may include variations in the magnitude of generated power based on a demand schedule and/or operating fluctuations which do not require significant change to the power output from power plant 100 (i.e., deviations from target power output, frequency, and/or phase shift of at most approximately fifteen percent).

Process P2 of the disclosure may include monitoring the electrical properties of power plant 100 (including, e.g., GT system 12) and grid 162 during operation. As used herein, the term "electrical properties" can refer to any conceivable property and/or group of properties indicative of the electrical operation, performance, etc., based on present data, historical operating data, models of power plant 100 and/or grid 162, etc. During operation, generator 152 may then be synchronized with grid 162, and electrical power may be transmitted to grid 162 via transmission lines 160. As this occurs, exciter controller 172 may be configured to monitor various electrical properties of grid 162. For example, exciter controller 172 may monitor grid 162 for transient events such as a rise or fall in grid frequency, a rise or fall in active power or reactive power of generator 152, etc. The transient event may include changes to electrical properties such as voltage, current, active or reactive power, power factor (i.e., ratio of actual power to apparent power in a circuit), etc.

To monitor electrical properties of power plant 100 in process P2, exciter controller 172 may monitor, measure, calculate, etc., any conceivable electrical property associated with generator 152, grid 162, or both. The electrical properties may include a rise or fall in grid frequency, a rise or fall in active power or reactive power of generator 152, voltage output by generator 152 and/or grid 162, current output by generator 152 and/or grid 162, power output by generator 152 and/or or grid 162, power factor of generator 152 or grid 162, etc. These and other electrical properties may be monitored using sensors (not shown) such as voltage sensors, current sensors, etc., that are coupled to and/or integrated with various components of power plant 100. Additionally or alternatively, exciter controller 172 may simulate these and other electrical properties of power plant 100 based on data received from the sensors. In some cases, monitoring for a "transient event" can also include exciter control program 212 monitoring whether any of the various electrical properties may pose a risk of destabilizing turbomachine assembly 120 (e.g., frequencies, voltages, etc., that are significantly higher or lower than predetermined limits). Regardless of the actions taken in process P2, the electrical properties of power plant 100 may be stored, e.g., within generator data field 252 and the electrical properties of grid 162 may be stored, e.g., within grid data field 254.

Proceeding to decision D1, methods of the disclosure may include detecting the presence of a transient load on grid 162 (i.e., a power output that varies significantly with time) and power plant 100. Operation of power plant 100 at a transient load may significantly defined by the system reactance of grid 162, as measured via exciter controller 172. Decision D1 may include, e.g., using modules 242 of exciter control program 212 to identify a transient event based on the output of generator 152, system reactance of grid 162, and/or by reference to other electrical properties monitored in process P2. The term "system reactance," as noted herein, refers to the opposition of current flow within and/or between power plant 100 and grid 162 stemming from inductive and/or capacitive elements. According to one example, exciter control program 212 may determine that a transient load is present when generator 152 increases its power output to meet a higher load or drop in load, and the reactance detected on grid 162 via exciter 170 significantly increases, and these events occur within a predetermined timespan of each other (e.g., higher load and reactance being detected within milliseconds of each other). According to further examples, detecting the transient load may include, e.g., identifying a load swing increase or decrease on generator 152 which stems from an increase or decrease in the number of operable lines in set of transmission lines 160. The term "load swing" refers to changes in the amount of power transferred from power plant 100 to grid 162 at a given time and operating conditions. A load swing refers to fluctuations in power transfer from power plant 100 to grid 162 over time. An increased load angle may indicate an increase in the number of transmission lines, while a decreased load angle may indicate a decrease in the number of transmission lines.

Figure 5:
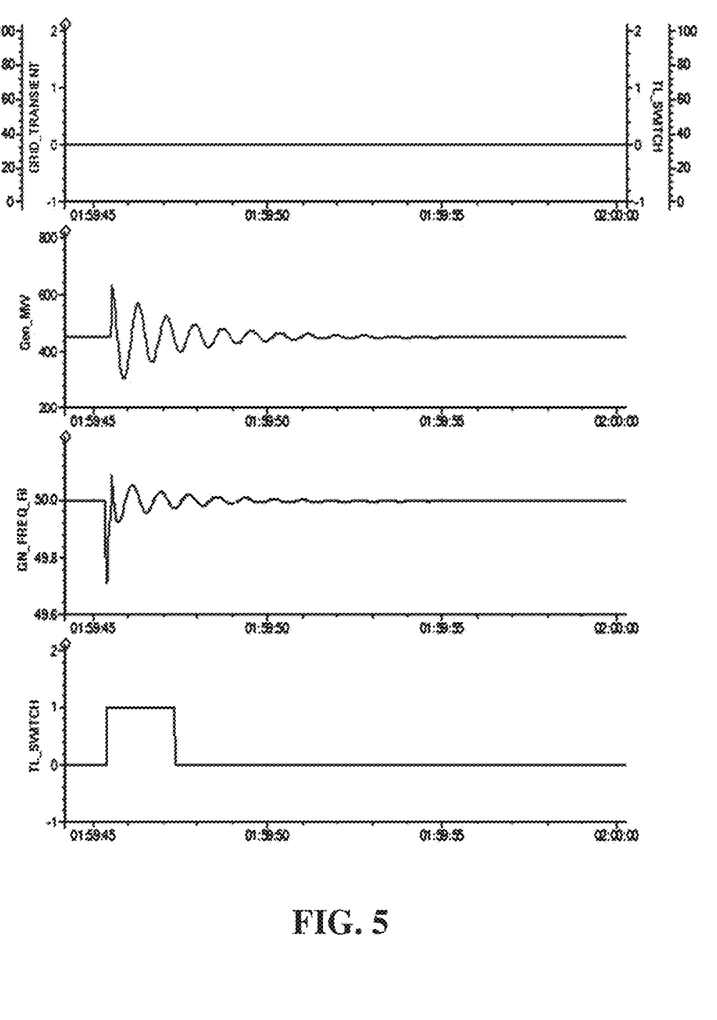
FIG. 5 provides an example set of plots illustrating power output and frequency during the loss of an available transmission line in methods according to the disclosure.
Figure 6:
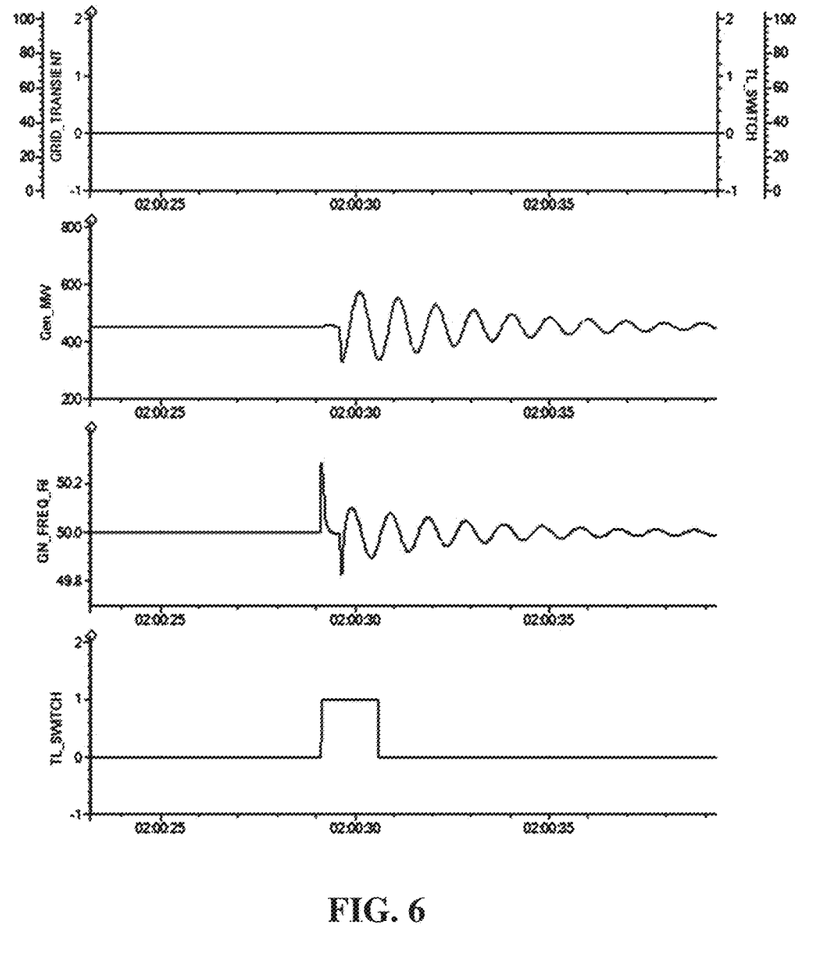
FIG. 6 provides an example set of plots illustrating power output and frequency during the addition of an available transmission line in methods according to the disclosure.

Referring briefly to FIGS. 4-6, The monitoring of electrical properties in process P2 may be configured to identify an increase in the number of available transmission lines 160 (FIG. 5), or a reduction in the number of available transmission lines 160 (FIG. 6). For example, generator 152 may initially produce a stable output of, e.g., approximately 450 MW as shown in the plot of FIG. 5. The sudden loss of one or more transmission lines 160 may cause a sudden increase in the torque of generator 152 and thus produce wide fluctuations in power output over a brief time (e.g., fluctuations between approximately 300 MW and 600 MW over a span of only 50 ms). The loss of transmission line(s) 160 may also cause fluctuations in the frequency of generator 152, e.g., a sudden loss or gain of about 2% or more in signal frequency over the same time span. The sudden addition of new transmission lines 160 (e.g., from repair) may create similar but less severe disruptions in power output and frequency from generator 152. For instance, the return of one or more transmission lines 160 to operability may cause the power output to fluctuate between approximately 550 MW and approximately 350 MW over a period of approximately 200 ms, with the magnitude gradually returning to approximately 450 MW, as shown in the accompany plot of FIG. 6. Over the same time span, the frequency may fluctuate between approximately 1% more and 1% less than its initial value. These distinct characteristics may indicate that a switching event has occurred. In cases where exciter control program 212 does not detect a transient event (i.e., "No" at decision D2), the method may return to processes P1 and P2 of operating power plant 100 and monitoring the electrical properties of generator 152 and grid 162. In cases where exciter control program 212 detects a transient event (i.e., "Yes" at decision D2), the method may continue to subsequent processes for determining whether a switching operation has created the transient event.

Referring again to FIGS. 3 and 4, process P3 may include monitoring the system reactance of power plant 100 throughout operation of power plant 100 at the transient load. Such elements may oppose power transfer more strongly during operation at transient loads, and thus may affect the total delivery of power from power plant 100 to grid 162. The monitoring of system reactance in process P3 may include, e.g., sampling the electrical impedance at generator 152 of power plant 100 via exciter controller 172. The electrical impedance may be sampled at predetermined intervals, or may be continuous as turbomachine assembly 120 and generator 152 continue to operate. By measuring the impedance and comparing the impedance with the known, defined parameters(s) of power plant 100 and/or grid 162, exciter control program 212 may derive the maximum/minimum power transfer capability of power plant 100 at a particular instance. During the execution of process P3, power plant 100 may continue to operate using its non-transient control setting (e.g., as discussed in process P1). Further processing according to the disclosure may include evaluating whether the monitored reactance is within an expected range for changes in the load on power plant 100, or if the reactance exceeds one or more switching thresholds and thus indicates the occurrence of a switching event (e.g., one or more of transmission lines 160 becoming inoperable or restored to operability).

Methods of the disclosure may include additional or alternative processes to distinguish between different magnitude of system reactance during transient operation. In particular, modules 242 of exciter control program 212 may implement further operations to characterize the system reactance of power plant 100 during transient operation. Some embodiments of the disclosure may include process P3.1 of calculating a switching threshold (expressed, e.g., as a maximum system reactance, percentage of a reference value of system reaction, etc.) for operation at the transient load. In process P3.1, modules 242 of exciter control program 212 may calculate one or more threshold magnitudes of system reactance indicative of switching events on transmission lines 160 or significant electrical fault in the transmission system. The calculated switching threshold(s) may be based at least partially on the monitored electrical properties of power plant 100 and grid 162, and may be stored in threshold field 256 after being calculated. After the switching threshold(s) are calculated in process P3.1, the method may return to process P3 of monitoring the system reactance of power plant 100.

Methods of the disclosure may include decision D2 of determining (e.g., via modules 242 of exciter control program 212) whether the system reactance of the grid as monitored in process P3 exceeds a switching threshold. Monitored values of reactance that exceed the switching threshold may indicate that a switching event has occurred on transmission lines 160 (e.g., one or more transmission lines have newly become operable or inoperable). The switching threshold used for comparison may be one or more predetermined switching thresholds provided in threshold field 256, and/or may include at least one threshold reactance calculated in process P3.1, where applicable. As an example, an operator of power plant 100 may characterize a range of system reactance values as being higher or lower than anticipated values for operating power plant 100 at transient loads. During the implementation of processes P2, P3, and P3.1, and decisions D1, D2, power plant 100 may continue to operate with the non-transient control setting, as described herein regarding process P1. As noted previously, the switching threshold may specify a maximum system reactance (e.g., approximately 0.25 per unit on Generator base). In cases where the system reactance as monitored in process P3 exceeds the switching threshold (i.e., "yes" at decision D2), further processing may include operating turbomachine assembly 120 with a first control setting. The first control setting of Gas turbine controller may include various operating settings for gas turbine that compensate for the effects of a switching event on transmission lines 160. The various properties of first control setting are described in further detail elsewhere herein.

In cases where the monitored system reactance does not exceed the switching threshold (i.e., "no" at decision D2), further processing may include a decision D3 of determining whether one or more of the monitored electrical properties exceed a stability threshold for power plant 100. As discussed elsewhere herein, process P2 may include monitoring the electrical properties of power plant 100 and grid 162, e.g., to detect the presence of a transient load on power plant 100. Decision D3 may include further determining whether one or more of the monitored electrical properties exceeds a stability threshold for power plant 100. As used herein, the term "stability threshold" refers to a maximum, minimum, or range of electrical parameters for stable operation (i.e., operation without significant outages, electrical or mechanical damage of components, etc.) of power plant 100. According to an example, a stability threshold used for comparison in decision D2 may include a frequency deviation (e.g., at most approximately ±5% of rated nominal frequency), a voltage amplitude deviation (e.g., approximately ±5% to 80%), a maximum load angle drift between power plant 100 output and grid 162 load (e.g., at most approximately greater 90 degrees). In cases where the electrical properties do not exceed the stability threshold (i.e., "No" at decision D3), the method may conclude ("Done") without any changes to the operation of power plant 100, or alternatively may return to process P1 of continuing to operate power plant 100 via the non-transient control setting. In cases where one or more electrical properties exceed the stability threshold (i.e., "Yes" at decision D3), the method may proceed to process P5 of operating turbomachine assembly 120 with a second control setting. The second control setting implemented in process P5 may be different from the first control setting in process P4, e.g., at least by accounting for possible operating instabilities but without further modifications to compensate for switching events on transmission lines 160.

Referring first to process P4, embodiments of the disclosure may include operating turbomachine assembly 120 with a first control setting in response to detecting a system reactance on grid 162 in excess of the switching threshold. Values of system reactance which exceed the switching threshold may indicate that a switching event has occurred on transmission line(s) 160, and thereby caused power plant 100 to operate in a transient state. In this case, embodiments of the disclosure include modifying the operation of power plant 100 to compensate for the electrical effects (e.g., changes in load swing, power transfer, phase shift, etc.) of a switching event. In process P4, GT control program 214 can cause turbomachine assembly 120 to operate using a first control setting. The first control setting may differ from the non-transient control setting at least by causing turbomachine assembly 120 to use a transient fuel management profile, a transient split bias profile, and a dynamic intake parameter. In some cases, methods according to the disclosure may include an additional process P4.1 of creating the first control setting based on, e.g., the monitored electrical properties and/or grid reactance. The term "create," when used in the context of a control setting for power plant 100, may refer to the calculation, modeling, simulation, and/or other projections of how turbomachine assembly 120 will operate during the transient event, and computing various operational parameters and/or target values for turbomachine assembly 120 that may be adjusted by way of exciter controller 172 and/or GT controller 180. However derived, the various parameters within the first control setting and/or the second control setting may be stored, e.g., in control setting field 258 of data 250.

A "transient fuel management" profile refers to specified parameters for combustion and use of fuel in turbomachine assembly 120. As examples, the transient fuel management profile may control one or more of: combustion temperature, firing rate, fuel injection rate, and/or other variables affecting the transfer of fuel from fuel supply 140 to combustor 138 and/or the behavior of combustor 138 during operation. The transient fuel management profile within the first control setting may differ from the non-transient control setting, e.g., by increasing the combustion temperature or fuel injection rate, to higher/lower values to compensate for an increased/decreased load on power plant 100 from grid 162. As examples, operating turbomachine assembly 120 with the first control setting may include increasing the firing temperature from approximately 1200 degrees Celsius (° C.) to approximately 1400° C., increasing the fuel injection rate in liters per second by approximately twenty percent of its initial value, and/or undertaking similar adjustments to the use of fuel in turbomachine assembly 120.

The first control setting may also include a transient split bias profile, which causes further operating parameters of turbomachine assembly 120 to be different from their values in the non-transient control setting. The transient split bias profile of the first control setting may affect, e.g., the ratio of air volume to fuel volume across different burners in combustion chambers ("split ratio") as they are introduced into combustor 138 from compressor 122 and fuel supply 140, respectively. Although the split ratio may be fixed to a set value or limited range during non-transient operation, the transient split bias profile may cause turbomachine assembly 120 to use a different value and/or range of split ratios depending on the present demand by grid 162 on turbomachine assembly 120, and/or the rate at which the transient load increases or decreases during the transient operation. The split ratio(s) that GT control program 214 uses as part of the first control setting may include a distinct range, or an expanded range, as compared to the corresponding split ratio(s) of the non-transient operating setting. According to an example, the non-transient control setting for GT system 100 may bias the split ratio to approximately 170:1, while the first control setting may bias the split ratio to approximately 150:1.

In addition to the above-noted operational adjustments, the first control setting may also affect a "dynamic intake parameter" of turbomachine assembly 120. As used herein, the term "dynamic intake parameter" may refer to any parameter of compressor 122 and/or inlet 124 operation that is independent of fuel management or split bias of turbomachine assembly 120. Such parameters may include, e.g., the temperature or pressure of inlet 124, the position and/or orientation of IGVs 126, and/or other operating parameters of compressor 122. Such parameters are designated as "dynamic" in the context of the first control setting because they do not remain at a fixed value to better compensate for the transient load on power plant 100 and the switching event on transmission line(s) 160. According to an example, the first control setting may cause IGVs 126 to adjust between two or more angular positions (e.g., between five degrees and ten degrees offset with respect to an initial, completely open orientation) over a predetermined timespan, may modulate the temperature or pressure (e.g., using one or more heat exchangers, fluid control valves, etc.) of inlet 124 between two or more predetermined values (e.g., between approximately 22° C. and approximately 26° C.) over a predetermined timespan.

Regardless of the specific parameters chosen for adjustment in the first control setting, process P4 may include causing GT controller 180 to adjust one or more components of turbomachine assembly 120 to use the first control setting throughout the transient load. The use of the first control setting in process P4 may continue until exciter controller 172 detects the end of the transient event and/or a reduction in the system reactance of grid 162. Such determinations, and subsequent actions, occur in decision D4 as discussed elsewhere herein.

In cases where the system reactance does not exceed the switching threshold, but one or more electrical properties exceed a stability threshold (i.e., "Yes" at decision D2 and "Yes" at decision D3), the method may include process P5 of operating turbomachine assembly 120 with a second control setting. In process P5, controller 172 may cause GT controller 180 to alter various operating settings of turbomachine assembly 120 in a manner different from the first operating setting. Specifically, the second operating setting may include the dynamic intake parameter(s) used for the first control profile, but may not include either the transient fuel management profile or split bias profile. The absence of the transient fuel management profile and split bias profile from the second control setting may reflect the prior determination, in decision D2, that the switching threshold is not exceeded and thus a switching event has not occurred on transmission lines 160. Thus, the second control setting may be configured to accommodate situations where one or more electrical properties exceed the stability threshold, but without compensating for a switching event on transmission lines 160.

In some implementations, an additional process P5.1, of creating the second control profile, may precede process P5. Process P5.1 may include any combination of calculations, models, simulations, etc., suitable to provide a dynamic intake profile to be used within the second control setting, based on the monitored electrical properties of power plant 100 and grid 162. Apart from not applying a transient fuel management profile or split bias profile, exciter controller 172 and GT controller 180 may cause turbomachine assembly 120 to implement the dynamic intake profile in substantially the same manner, or manner similar to, the implementing of a dynamic intake profile as part of the first control setting. Thus, process P5 may include adjusting IGVs 126 between various positions, increasing or decreasing the temperature or pressure of inlet 124 (e.g., using one or more heat exchangers, fluid control valves, etc.). The various parameters used for adjusting turbomachine assembly 120 may be stored, e.g., in control setting field 258 of data 250 as noted elsewhere herein. It is noted that the dynamic intake profile used in process P5 may not include any parameters applicable to the transient fuel management profile and/or transient split bias profile. Thus, operating turbomachine assembly 120 with the second control setting may not affect a combustion parameter or the split ratio of turbomachine assembly 120.

In the case that process P4 or process P5 is implemented, and turbomachine assembly 120 operates at the first control setting or second control setting, further processes may include continuing to evaluate whether turbomachine assembly 120 should continue to operate at the first control setting or second control setting. Decision D4 may include, e.g., determining via modules 242 of exciter control program 212 whether power plant 100 has resumed operation at its previous non-transient load, or that a new operational steady state has been reached. A new operational steady state refers to a situation in which power plant 100 has changed from operating at an initial load level to a new load level (e.g., transferring from base load to maximum load and vice-versa, or from startup load to base load and vice-versa, etc.) The determination in decision D4 may be based on, e.g., electrical properties of power plant 100 and/or grid 162 that are observable with exciter control system 172 evaluating the operation of generator 152. In cases where the non-transient load has not resumed or a new operational steady state has not been reached (i.e., "No" at decision D4), the method may return to decision D2 of again determining whether the monitored reactance exceeds the switching threshold, and proceeding with one or more of processes P1, P4, D3, or P5 as discussed herein. In cases where the non-transient load has resumed, or a new operational steady state is reached (i.e., "Yes" at decision D4), exciter control program 172 and GT controller 180 can cease applying the applicable first control setting or second control setting ("Done"), or the method may return to process P1 of resuming operation of turbomachine assembly 120 with the non-transient control setting.

Technical effects of the embodiments described herein include tailoring the response of power plant 100 to transient loads from grid 162 caused by a variety of sources. Power plant 100 may respond to a switching event on transmission lines 160 with one set of operating settings, while continuing to respond to other types of transient loads by way of a second, distinct control setting that does not pertain to variable affected by switching events (e.g., fuel management and/or split ratio). As a result, power plant 100 can compensate for different types of situations without being taken offline and/or reprogrammed in response to the sudden closure or opening of transmission lines from power plant 100 to grid 162.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for controlling a power plant having a generator mechanically coupled to a gas turbine through a shaft, the generator electrically coupled to a grid through a set of transmission lines, the method comprising:
    detecting a transient load on the power plant, based on electrical properties of the grid and electrical properties of the power plant, wherein the electrical properties of the grid include a system reactance of the grid;
    monitoring the system reactance of the grid via the generator during operation of the power plant at the transient load;
    determining whether the system reactance of the grid exceeds a switching threshold, the switching threshold being indicative of a switching event on the set of transmission lines;
    in response to the system reactance exceeding the switching threshold: operating the gas turbine at the transient load using a first control setting, the first control setting including a transient fuel management profile, a transient split bias profile, and a dynamic intake parameter for the gas turbine; and
    in response to the system reactance not exceeding the switching threshold, and one of the electrical properties of the power plant exceeding a stability threshold: operating the gas turbine at the transient load using a second control setting, the second control setting including the dynamic intake parameter for the gas turbine, wherein the second control setting does not include the transient fuel management profile or the transient split bias profile.

2. The method of claim 1, wherein detecting the transient load includes detecting a load swing increase on the generator caused by an increase of operable transmission lines in the set of transmission lines, or by a reduction of operable transmission lines in the set of transmission lines.

3. The method of claim 1, further comprising creating the first control setting and the second control setting based on a calculated difference between the system reactance and the switching threshold.

4. The method of claim 1, wherein the dynamic intake parameter for the gas turbine does not affect a combustion parameter for a combustor of the gas turbine.

5. The method of claim 1, wherein the dynamic intake parameter does not affect a split ratio between an air intake and a fuel intake of the power plant.

6. The method of claim 1, wherein each of the first control setting and the second control setting are different from a non-transient control setting for operating the gas turbine at a non-transient load.

7. The method of claim 6, further comprising operating the gas turbine at the non-transient control setting, while determining of whether the system reactance exceeds the switching threshold.

8. A program product stored on a computer readable storage medium for controlling a power plant having a generator mechanically coupled to a gas turbine through a shaft, and electrically coupled to a grid through a set of transmission lines, the computer readable storage medium comprising program code for causing a computer system to perform actions including:
    detecting a transient load on the power plant, based on electrical properties of the grid and electrical properties of the power plant, wherein the electrical properties of the grid include a system reactance of the grid;
    monitoring the system reactance of the grid via the generator during operation of the power plant at the transient load;
    determining whether the system reactance of the grid exceeds a switching threshold, the switching threshold being indicative of a switching event on the set of transmission lines;
    in response to the system reactance exceeding the switching threshold: operating the gas turbine at the transient load using a first control setting, the first control setting including a transient fuel management profile, a transient split bias profile, and a dynamic intake parameter for the gas turbine; and
    in response to the system reactance not exceeding the switching threshold, and one of the electrical properties of the power plant exceeding a stability threshold: operating the gas turbine at the transient load using a second control setting, the second control setting including the dynamic intake parameter for the gas turbine, wherein the second control setting does not include the transient fuel management profile or the transient split bias profile.

9. The program product of claim 8, wherein detecting the transient load includes detecting a load swing increase on the generator caused by an increase of operable transmission lines in the set of transmission lines, or a reduction of operable transmission lines in the set of transmission lines.

10. The program product of claim 8, further comprising creating the first control setting and the second control setting based on a calculated difference between the system reactance and the switching threshold.

11. The program product of claim 8, wherein the dynamic intake parameter for the gas turbine does not affect a combustion parameter for a combustor of the gas turbine.

12. The program product of claim 8, wherein the dynamic intake parameter does not affect a split ratio between an air intake and a fuel intake of the power plant.

13. The program product of claim 8, wherein each of the first control setting and the second control setting are different from a non-transient control setting for operating the gas turbine at a non-transient load.

14. The program product of claim 13, further comprising operating the gas turbine at the non-transient control setting, while determining of whether the system reactance exceeds the switching threshold.

15. A system comprising:
    a power plant having a generator mechanically coupled to a gas turbine through a shaft, and electrically coupled to a grid through a set of transmission lines; and
    a system controller in communication with the gas turbine of the power plant, the system controller being operable to:

detect a transient load on the power plant, based on electrical properties of the grid and electrical properties of the power plant, wherein the electrical properties of the grid include a system reactance of the grid;

monitor the system reactance of the grid via the generator during operation of the power plant at the transient load;

determine whether the system reactance of the grid exceeds a switching threshold, the switching threshold being indicative of a switching event on the set of transmission lines;

in response to the system reactance exceeding the switching threshold: operate the gas turbine at the transient load using a first control setting, the first control setting including a transient fuel management profile, a transient split bias profile, and a dynamic intake parameter for the gas turbine; and in response to the system reactance not exceeding the switching threshold, and one of the electrical properties of the power plant exceeding a stability threshold: operate the gas turbine at the transient load using a second control setting, the second control setting including the dynamic intake parameter for the gas turbine, wherein the second control setting does not include the transient fuel management profile or the transient split bias profile.

16. The system of claim 15, wherein the system controller detecting the transient load includes detecting a load swing increase on the generator caused by an increase of operable transmission lines in the set of transmission lines, or by a reduction of operable transmission lines in the set of transmission lines.

17. The system of claim 15, wherein the system controller further creates the first control setting and the second control setting based on a calculated difference between the system reactance and the switching threshold.

18. The system of claim 15, wherein the dynamic intake parameter for the gas turbine does not affect a combustion parameter for a combustor of the gas turbine.

19. The system of claim 15, wherein the dynamic intake parameter does not affect a split ratio between an air intake and a fuel intake of the power plant.

20. The system of claim 15, wherein the system controller is further configured to operate the gas turbine at a non-transient control setting while determining of whether the system reactance exceeds the switching threshold, and wherein each of the first control setting and the second control setting are different from the non-transient control setting.

* * * * *